(12) United States Patent
Yen et al.

(10) Patent No.: US 7,991,434 B2
(45) Date of Patent: Aug. 2, 2011

(54) COMBI-SIM CARD FRAMEWORK OF ELECTRONIC PURSE COMBINING WIRELESS TRANSCEIVER OF MOBILE DEVICE

(75) Inventors: Hong-Kai Yen, Yang-Mei Township, Taoyuan County (TW); Chen-Shin Miou, Yang-Mei Township, Taoyuan County (TW); Yeou-Fuh Kuan, Yang-Mei Township, Taoyuan County (TW); Po-Wen Ko, Yang-Mei Township, Taoyuan County (TW); Horng-Ren Chang, Yang-Mei Township, Taoyuan County (TW)

(73) Assignee: Chunghwa Telecom Co. Ltd., Taoyuan County (TW)

( * ) Notice: Subject to any disclaimer, the term of this patent is extended or adjusted under 35 U.S.C. 154(b) by 927 days.

(21) Appl. No.: 11/941,940

(22) Filed: Nov. 17, 2007

(65) Prior Publication Data

US 2009/0036166 A1    Feb. 5, 2009

(30) Foreign Application Priority Data

Jul. 31, 2007    (TW) ................................ 96127895 A

(51) Int. Cl.
*H04B 1/38* (2006.01)
*H04M 1/00* (2006.01)

(52) U.S. Cl. .................... 455/558; 455/556.1; 455/41.1; 455/552.1

(58) Field of Classification Search ............... 455/556.1, 455/557, 558, 552.1, 41.1, 41.2
See application file for complete search history.

(56) References Cited

U.S. PATENT DOCUMENTS

| | | | |
|---|---|---|---|
| 5,887,266 A * | 3/1999 | Heinonen et al. | 455/558 |
| 6,012,634 A * | 1/2000 | Brogan et al. | 235/380 |
| 6,250,557 B1 * | 6/2001 | Forslund et al. | 235/492 |
| 6,728,553 B1 * | 4/2004 | Lehmus et al. | 455/558 |
| 6,771,981 B1 * | 8/2004 | Zalewski et al. | 455/557 |
| 7,506,819 B2 * | 3/2009 | Beenau et al. | 235/487 |
| 7,650,630 B2 * | 1/2010 | Yamada et al. | 726/4 |
| 7,706,778 B2 * | 4/2010 | Lowe | 455/411 |
| 7,769,410 B2 * | 8/2010 | Wang | 455/558 |
| 7,929,910 B2 * | 4/2011 | Chen | 455/41.1 |
| 2005/0097038 A1 * | 5/2005 | Yu et al. | 705/40 |
| 2007/0030124 A1 * | 2/2007 | Lee | 340/10.1 |
| 2007/0106897 A1 * | 5/2007 | Kulakowski | 713/171 |
| 2009/0093272 A1 * | 4/2009 | Saarisalo et al. | 455/558 |
| 2010/0137024 A1 * | 6/2010 | Maguire | 455/552.1 |

* cited by examiner

*Primary Examiner* — Duc M Nguyen
(74) *Attorney, Agent, or Firm* — Ming Chow; Sinorica, LLC

(57) ABSTRACT

A Combi-SIM card framework of electronic purse combining wireless transceiver of mobile device is a framework that combines the mobile phone subscriber identity module (SIM or USIM) chip and the electronic purse smart card chip having no wireless induction analog circuit to form a complex subscriber identity module (hereinafter known as Combi-SIM) and further cooperates with a mobile device having multifunction wireless transceiver. Based on the fact that the multifunction wireless transceiver is equipped with the signal path selection functions, the mobile device not only works as a wireless card but also works as a card reader to read exterior wireless card or access the content of electronic purse smart card in the Combi-SIM. Herewith, it provides functions of electronic purse and telecommunication value added service integration. Consumer proceeds electronic purse transaction at anytime and anywhere through the convenience of carry-on mobile device.

4 Claims, 3 Drawing Sheets

COMBI-SIM CARD FRAMEWORK OF ELECTRONIC PURSE COMBINING WIRELESS TRANSCEIVER OF MOBILE DEVICE

FIELD OF THE INVENTION

The present invention relates to a Combi-SIM card framework of electronic purse combining wireless transceiver of mobile device which involves a Combi-SIM card framework of electronic purse cooperating with a mobile device having multifunction wireless transceiver. The framework of the present invention completely combines the wireless card payment and the mobile telecommunication network convenience to provide an innovative, convenient and high security application of mobile electronic purse transaction. On the other hand, the present invention provides a mobile device with the function of card reader to more enhance the added value of the mobile device and then develops other various applications.

BACKGROUND OF THE INVENTION

Nowadays the wireless card consumption such as Easy Card, Visa Wave, Paypass etc, all use a plastic card with a size of name card. The public holds card to spend money, add value and inquire balance. All have to be done at the POS machine of vendor at designated location. It is an inconvenience for consumer. Furthermore, as far as security is concerned the existing wireless card consumption is fast and convenient but compared with the contacting card it is recognized as less security by the public. Therefore the manner of wireless card consumption still has lots to be improved in convenience and security.

Currently under the circumstance that the public uses mobile device such as mobile phone, PDA more and more pervasive, it is certainly to come to a more convenient and practical consumption pattern by combining the wireless card and mobile device. Although recently an invention of building a wireless induction chip in the mobile phone SIM or USIM card has been invented, its framework still has the following drawbacks. Firstly, as stated in the abovementioned recent invention that a wireless induction chip is built into the SIM card and the RFID antenna is wounded around the SIM card or disposed at a proper location of the mobile device, the wiring connecting induction chip and RF antenna will be loaded with a high voltage analog signal of antenna resonance and causes the difficulty of design and implementation in mobile device. Secondly, as stated in the abovementioned recent invention framework that the RFID antenna is wounded around the SIM card, but after it is implemented due to the physical characteristics are not so good that the exterior POS machine can not induct the chip. It is a proof that the framework is not ideal. Thirdly, as stated in the abovementioned recent invention the mobile device can not access the content of the induction chip built in the SIM card directly it is doubtful to achieve the functions of mobile value adding, electronic purse balance inquiry or mobile payment.

As a result, the abovementioned conventional manner still has many drawbacks. It does not constitute a good design and needs to be improved.

In view of the abovementioned drawbacks of the conventional manner the inventor of the present invention endeavors to research and successfully invents a Combi-SIM card framework of electronic purse combining wireless transceiver of mobile device to provide an ideal, convenient and secure wireless mobile payment application.

SUMMARY OF THE INVENTION

The objective of the present invention is to provide a Combi-SIM card framework of electronic purse combining wireless transceiver of mobile device. Under the circumstance that nowadays the wireless card is gradually accepted by consumer and the use of mobile device such as mobile phone, PDA etc. is very pervasive if the mobile device and wireless card transaction application are combined together it not only creates the added value of mobile device but also enhances the security and convenience of wireless electronic ticket transaction. Accordingly it will provide a new model of mobile payment transaction and broaden the application domain of the wireless card.

A Combi-SIM card framework of electronic purse combining wireless transceiver of mobile device is a framework of combining the mobile phone subscriber identity module (SIM or USIM) chip and the electronic purse smart card chip having no wireless induction analog circuit to form a complex subscriber identity module (hereinafter known as Combi-SIM) and further cooperates with a mobile device having multifunctional wireless transceiver. The mobile device includes, but not limit to, mobile phone, PDA etc. Based on the fact that the multifunction wireless transceiver is equipped with the signal path selection function, the mobile device not only works as a wireless card but also works as a card reader to read exterior wireless card or access the content of electronic purse smart card in the Combi-SIM. Herewith, it provides the functions of electronic purse and telecommunication value added service integration. Consumer proceeds electronic purse transaction such as inquiring balance, adding value and spending money at the POS machine of vendor at the designated location in wireless manner or paying via telecommunication network at non-designated location at anytime and anywhere through the convenience of carry-on mobile device. Furthermore, due to the combination of electronic purse and SIM card the electronic purse transaction can be introduced with the identity verification security mechanism of SIM card imposed by telecommunication mobile network. It enhances the security of electronic purse transaction extensively as well as the willingness to use by consumer. On the other hand, regarding the electronic ticket vendor it does not need to develop value adding locations so as to save the infrastructure cost of the value adding machine to a large extent.

The Combi-SIM card framework of electronic purse combining wireless transceiver of mobile device that achieves the abovementioned objective improves the drawbacks of the conventional technique and provides a convenient, high security, practicable and multifunctional mobile electronic payment framework.

To achieve the abovementioned objectives the present invention builds the smart card chip of electronic purse having no wireless induction analogous circuit and the SIM or USIM card chip of mobile telecommunication into a small card, known as Combi-SIM card, wherein the smart card chip of electronic purse is not equipped with analog integrated circuit but utilizes the copper contacts C6, C4, C8 retained in the SIM card international specification to connect with the wireless transceiver of mobile device. Since such a connection interface is a low voltage digital logic signal interface it is easy for implementation. The interface enables mobile device to control or access the smart card of electronic purse. Additionally, the RFID antenna and transceiver are close each other and disposed at a proper location of mobile device circuit substrate. As a result it is easy to be implemented. The RFID antenna plays dual functions of card reader antenna and card antenna. Based on the fact that the wireless transceiver of mobile device is provided with three signal path selections, the mobile device is equipped with three functions. It not only works as a wireless card but also works as a card reader to read the exterior wireless card or access the content of smart card of electronic purse in the Combi-SIM.

The master controller of mobile device can control the signal path of wireless transceiver arbitrarily according to requirement. The first signal path mode: an exterior wireless card reader such as POS machine of vendor which accesses the electronic purse in the Combi-SIM card. Consumer uses the Combi-SIM card inserted mobile device as a wireless card such as Easy Card, ATM card, value stored card or other electronic purse or electronic ticket card without carrying additional card. However, it includes but not limit to the abovementioned. Since it does not need to carry additional card and transact via wireless induction it meets the requirements of convenience, rapidness and practicability. The second signal path mode: it enables mobile device to access the content of smart card of electronic purse in the Combi-SIM. Therefore it achieves the function that consumer can inquire transaction record, balance, added value or other ATM card transfer. However, it includes but not limit to the abovementioned. The third signal path mode: it enables the mobile device to work as a wireless card reader to access exterior wireless card or RFID tag. Such a mode further broadens the application of the framework. For example consumer holds mobile device to read the content of electronic tag adhered on the commodity by the vendor, read the commodity advertisement by using the convenient display screen of mobile device or adhere tour guide introduction tag in the exhibition hall to provide tour guide introduction function etc.

Considering the wireless transaction security, since the present invention framework fully combines the convenience of wireless card payment and mobile device and mobile telecommunication network, the security of wireless transaction is largely enhanced by utilizing the identity verification mechanism of SIM card imposed by the mobile telecommunication network.

BRIEF DESCRIPTION OF THE DRAWINGS

The drawings disclose an illustrative embodiment of the present invention which serves to exemplify the various advantages and objects hereof, and are as follows.

Figure 1:
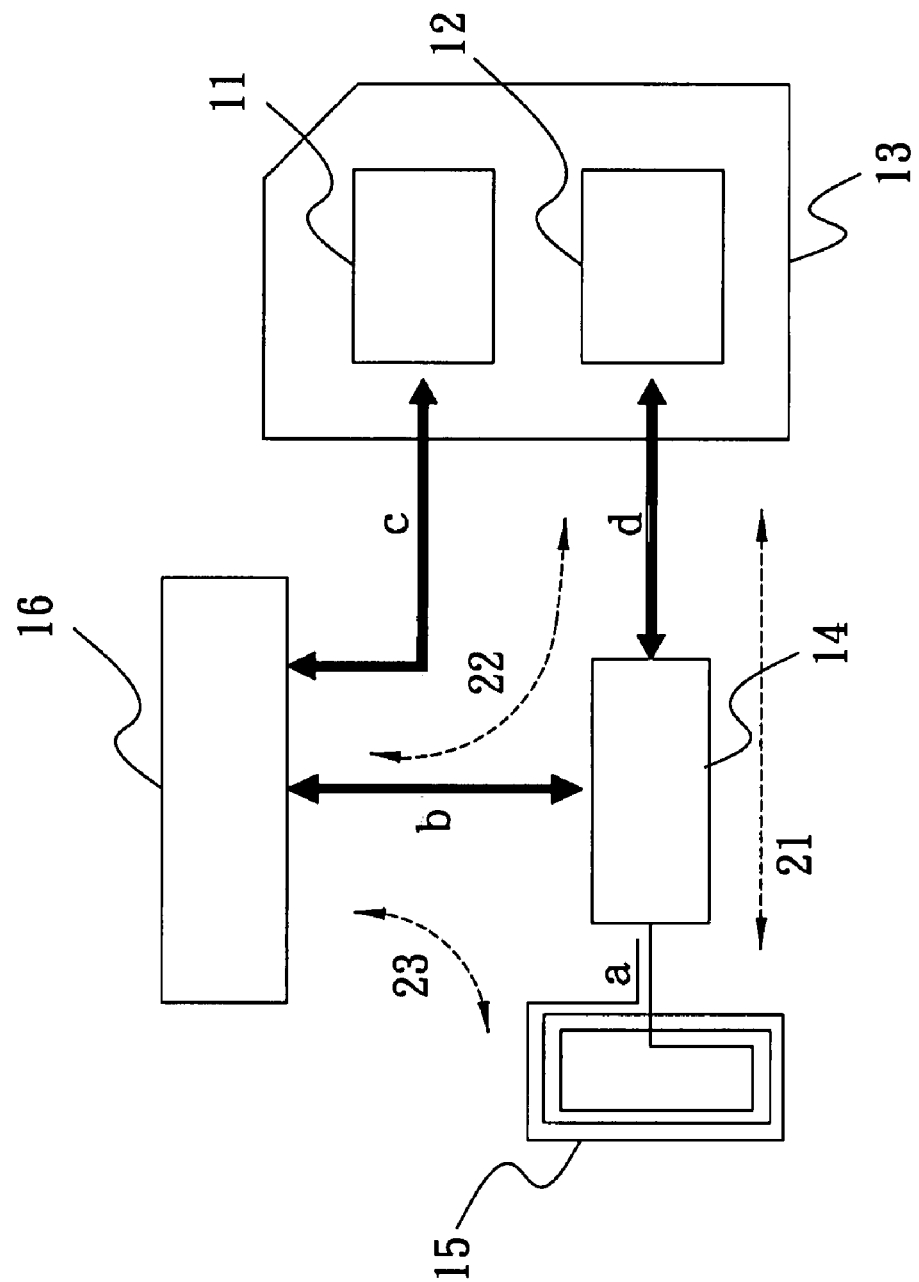
FIG. 1 is a schematic diagram of the Combi-SIM card framework of electronic purse combining wireless transceiver of mobile device.

a connection interface
b connection interface
c connection interface
d connection interface
11 SIM or USIM chip
12 smart card chip
13 Combi-SIM card
14 wireless transceiver
15 RFID antenna
16 mobile device master controller
21 first signal path
22 second signal path
23 third signal path
40 mobile device
41 vendor wireless POS
42 mobile telecommunication vender
43 financial or ticket vender
44 game or music content provider
51 vender electronic advertising tag
52 electronic advertising vender website

DETAILED DESCRIPTION OF THE PREFERRED EMBODIMENT

Comparing the Combi-SIM card framework of electronic purse combining wireless transceiver of mobile device provided by the present invention with other conventional technique it has the following advantages:

1. In the present invention the smart card chip in the Combi-SIM card which is a digital interface, RF antenna and wireless transceiver are built into the mobile device. They improve the drawbacks of difficult implementation and inferior performance in conventional technique.

2. In the present invention the wireless transceiver built in the mobile device is equipped with three signal path selection functions. It enables the mobile device to work as a wireless card, a card reader to read exterior wireless card or access the content of electronic purse smart card in the Combi-SIM.

3. In the present invention consumer can inquire transaction record, balance, added value or other ATM card transfer etc to attain the function of mobile payment transaction.

4. The mobile device of the present invention can work as a wireless card reader to increase the additional application of mobile device. For example consumer can hold mobile device to read the content of electronic advertising tag adhered on the commodity by the vendor, read the commodity advertisement by using the convenient display screen of mobile device or adhere tour guide tag in the exhibition hall to provide tour guide function. Such a manner it further broadens the domain of wireless transaction application and then develops other various applications.

5. Due to the present invention is provided with mobile transaction capability the wireless payment application can be mobilized. In addition to use conveniently regarding financial industry or electronic ticket vender it does not need to develop adding value location so as to eliminate the infrastructure cost of adding value machine to a large extent. Accordingly, it diminishes the operation cost effectively.

6. Since electronic purse and SIM card are combined together electronic purse transaction can be introduced with the identity verification security mechanism of SIM card imposed by the telecommunication mobile network. It enhances the security of electronic purse transaction to a large extent and increases the willingness of use for consumer.

Referring to the drawings the following will provide a clear and accurate description of the Combi-SIM card framework of electronic purse combining wireless transceiver of mobile device to have a full understanding of the preferred embodiment of the present invention. The framework of the present invention at least comprises:

1. A SIM or USIM chip (11): it conforms to the specification enacted by international organization. Its function is responsible for mobile telecommunication.

2. A smart card chip (12) without wireless induction analog circuit: it is electronic purse chip or other ATM card chip, cash card chip etc.

3. A wireless transceiver with signal path selection function (14): it is disposed at a proper location of the mobile device (40) substrate and controlled by the master controller (16) of the mobile device to provide three signal path selections.

4. A RFID antenna (15): it is disposed at a proper location of the mobile device (40) substrate and close to the wireless transceiver (14). When the mobile device (40) plays the role of card reader it works as an RFID antenna (15) of card reader. When the mobile device (40) plays the role of wireless card, it works as a card antenna RFID (15).

5. A mobile device (40): wherein the master controller is the main processor of conventional mobile device (40). The master controller connects and controls the wireless transceiver (14).

Referring to FIG. 1, it is a schematic representation of the Combi-SIM card framework of electronic purse combining wireless transceiver of mobile device, wherein SIM or USIM chip (11) and smart chip (12) are built into the Combi-SIM card (13). SIM or USIM chip (11) in the Combi-SIM card utilizes contacts C1, C2, C3, C5 and C8 to connect with the master controller (16) of the mobile device. Smart card chip (12) utilizes the remaining contacts C6, C4, C8 to connect with the wireless transceiver (14). In addition to the connection interface (a) of RFID antenna (15) and wireless transceiver (14) is an analog high voltage signal, the other interfaces include: the connection (b) of the mobile device master controller (16) and wireless transceiver (14), the connection (c) of the mobile device master controller (16) and SIM or USIM chip (11), the connection (d) of the wireless transceiver (14) and smart card chip (12). They are all above-mentioned interfaces are digital logic low voltage signal interface.

According to the need of circumstances, the mobile device master controller (16) can control the signal path of the wireless transceiver (14) arbitrarily. The first signal path (21): it enables the mobile device (40) to work as a conventional wireless card. After the radio frequency signal command of the vendor wireless POS machine is inducted by RFID antenna (15) it is modulated into digital logic signal and transmitted to the smart card chip (12). Accordingly it can access the content of the smart card chip (12) in the Combi-SIM card. The second signal path (22): the mobile device master controller (16) transfers control command to the smart card chip in the Comni-SIM card (13) via the wireless transceiver (14). The control command is a digital logic signal without being modulated by radio frequency. In fact, as the smart card chip is concerned the mobile device (40) is just like a wireless card reader to access it. The mobile device (40) is like a mobile POS or mobile ATM. Therefore consumer can use mobile device (40) to inquire transaction record, balance, adding value or other ATM card transfer etc. It includes but not limit to the abovementioned. The third signal path (23): after the control command of the mobile device master controller (16) is modulated by the wireless transceiver (14), it is emitted to the exterior via RFID antenna (15). Therefore the mobile device (40) can work as a wireless card reader to access exterior wireless card or RFID tag. Such a manner further broadens the application of the framework. For example consumer holds the mobile device (40) to read the content of electronic advertising tag adhered on the commodity by the vendor, read the commodity advertisement by using the convenient display screen of the mobile device (40) or adhere tour guide tag in the exhibition hall to provide tour guide function.

To enable the person skilled in the art to understand the benefits and objectives of the present invention, a preferred embodiment of the present invention is illustrated for reference. However, it includes but not limit to the abovementioned application.

Figure 2:
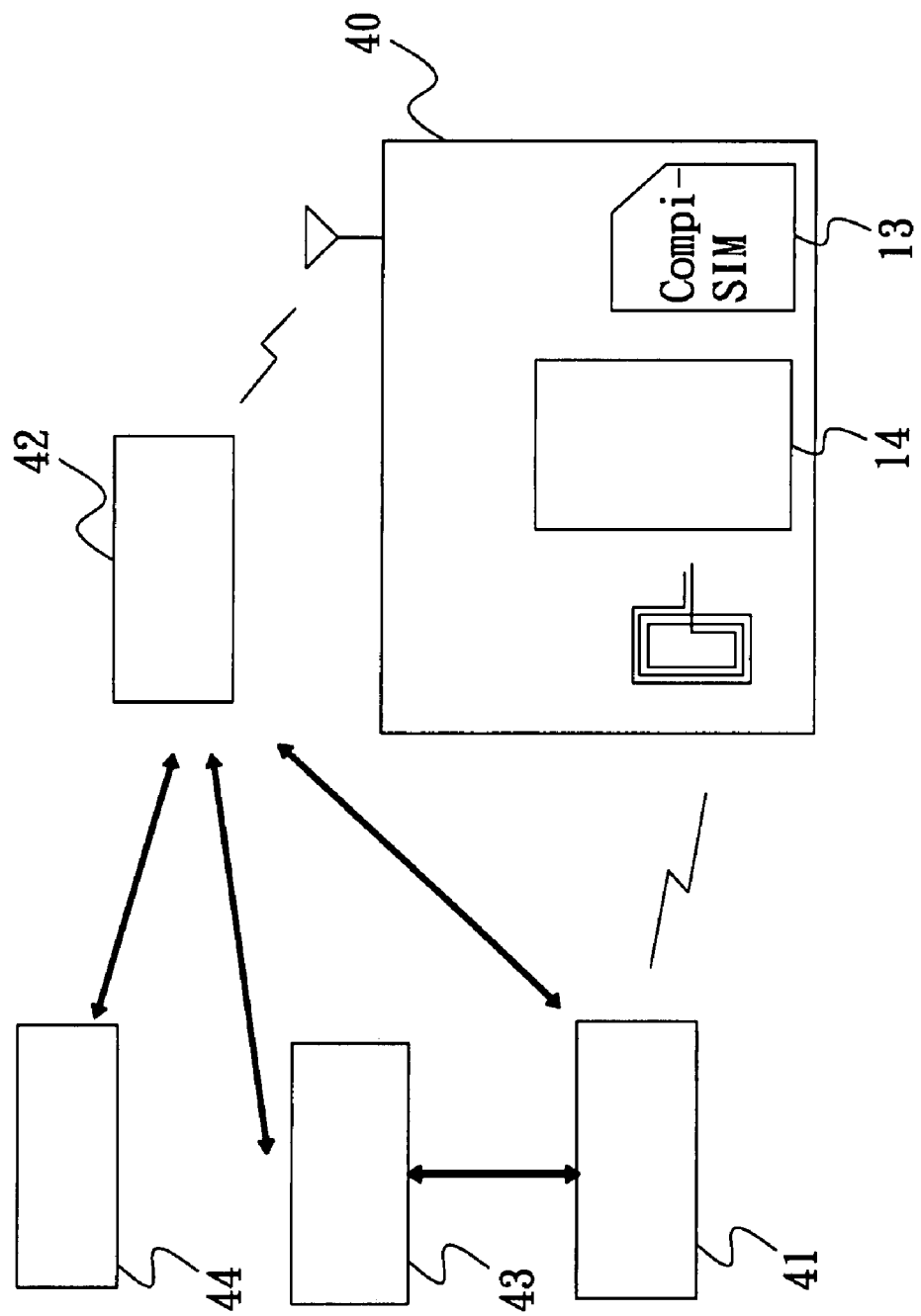
FIG. 2 is a schematic diagram of wireless transaction at designated location and mobile payment applied by the Combi-SIM card framework of electronic purse combining wireless transceiver of mobile device.

Referring to FIG. 2, it is a schematic representation of the wireless transaction at designated location and mobile payment by the application of the Combi-SIM card framework of electronic purse combining wireless transceiver of mobile device. It simply illustrates how to apply the present invention to the wireless consumption in the store or pay the wireless music or game download provided by mobile telecommunication vendor via mobile device (40). When consumer holds mobile device (40) to spend money in the store, firstly the vendor wireless POS (41) deducts money from electronic purse in the Combi-SIM card. The vendor or financial or ticket vendor (43) can transmit message via mobile telecommunication vendor (42) or via other message transmission manner by other mobile network to consumer. The message can be consumption confirmation message or commodity promotion advertisement etc. Since the mobile device (40) of the present invention can access the electronic purse in the Combi-SIM card (13) directly consumer can use the mobile device (40) cooperated with the service provided by the mobile telecommunication vendor (42) to inquire balance, adding value or mobile payment function etc at anytime and anywhere. As shown in the FIG. 2, consumer holds the mobile device (40) downloads music or game via wireless environment provided by the mobile telecommunication vendor (42) and pays via the electronic purse in the Combi-SIM card (13).

Figure 3:
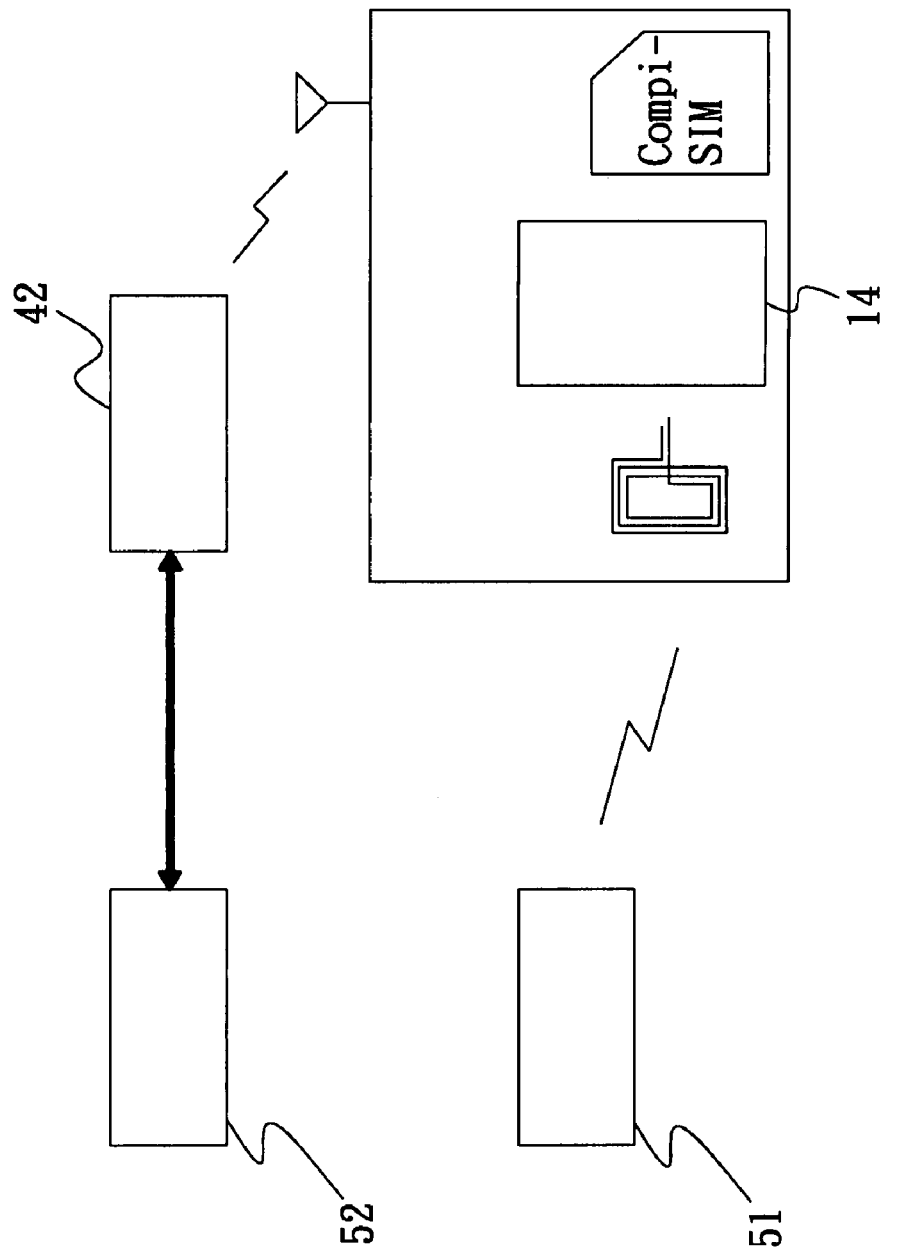
FIG. 3 is a diagram of an embodiment of the Combi-SIM card framework of electronic purse combining wireless transceiver of mobile device working as a card reader.

Referring to FIG. 3, it is an illustration of the Combi-SIM card framework of electronic purse combining wireless transceiver of mobile device to work as a card reader. It simply illustrates the possible application situations that the mobile device (40) of the present invention works as a card reader. Consumer holds mobile device (40) to read the electronic advertising tag (51). The mobile device (40) acquires vender web site address and links to the electronic advertising vendor website (52) via wireless transmission provided by the mobile telecommunication vendor (42). After consumer browses commodity introduction he can download electronic coupon into the Combi-SIM card (13) via wireless transmission provided by the mobile telecommunication vendor. Later, when consumer holds the mobile device (40) to proceed wireless consumption at POS machine in the store since the coupon information is stored in the Combi-SIM card (13) he can acquire discount benefits accordingly.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A Combi-SIM card framework of electronic purse combining a wireless transceiver of a mobile device, wherein comprising:
    a Combi-SIM card, the Combi-SIM card having a capacity to accommodate more than one chip and electronic wiring to provide signal connection for the interior chips and exterior system;
    a SIM or USIM card chip, the SIM or USIM card chip being built into the Combi-SIM card and responsible for the function of mobile communication;
    a smart card chip, the smart card chip being built into the Combi-SIM card and arranged in parallel with the SIM or USIM card chip, wherein the smart card chip does not have wireless induction analog circuit and works as electronic purse chip or Easy Card chip or other ATM card chip;

the wireless transceiver, with signal path selection function, being equipped with electronic wiring to transmit signal to the Combi-SIM card and disposed at a proper location of the mobile device substrate and controlled by the mobile device master controller to provide a plurality of signal path selections;

a RFID antenna, the RFID antenna being disposed at a proper location of the mobile device substrate and connecting with the wireless transceiver, wherein when the mobile device plays the role of card reader the RFID antenna works as an antenna of card reader and when the mobile device plays the role of a RFID tag, the RFID antenna works as an antenna for the RFID tag;

the mobile device, having a RF antenna and the wireless transceiver being disposed inside, and having a insertion slot for the Combi-SIM card, wherein the master controller of the mobile device substrate connects and controls the wireless transceiver.

2. The Combi-SIM card framework of electronic purse combining the wireless transceiver of the mobile device according to claim 1, wherein the smart card chip having no wireless induction analog circuit and the SIM or USIM card chip are built into the Combi-SIM card, wherein the smart card chip of electronic purse is not equipped with analog integrated circuit but utilizes the copper contacts C6, C4, C8 retained by the SIM card international specification to connect with the wireless transceiver of the mobile device, and such a connection interface is a low voltage digital logic signal interface.

3. The Combi-SIM card framework of electronic purse combining the wireless transceiver of the mobile device according to claim 1, wherein the wireless transceiver having signal path selection function is disposed at a proper location of the mobile device substrate and controlled by the master controller of the mobile device and provides three signal path selections:

a first signal path, the first signal path being comprised by the RFID antenna, the wireless transceiver and the smart card chip in the Combi-SIM card to form a wireless card function, the exterior wireless card reader accesses the electronic purse in the Combi-SIM card;

a second signal path, the second signal path being comprised by the mobile device master controller, the wireless transceiver and the smart card chip in the Combi-SIM card and enabling the mobile device to access the data content of the smart card of electronic purse in the Combi-SIM, the user inquires the transaction record, balance, added value or other ATM card transfer application; and a third signal path, the third signal path being comprised by the RFID antenna, the wireless transceiver and the mobile device master controller and enabling the mobile device to work as a wireless card reader to access an exterior RFID tag, wherein herewith user acquires the related information from it.

4. The Combi-SIM card framework of electronic purse combining the wireless transceiver of the mobile device according to claim 1, wherein after the Combi-SIM card is inserted into the mobile device having a RF antenna and wireless transceiver built in, the mobile device is added with three functions besides the mobile telecommunication function:

a first function: the mobile device works as a wireless card to be accessed by exterior wireless card reader, consumer uses the mobile device having the Combi-SIM card inserted as wireless card such as Easy Card, ATM card, Value Added Card or other electronic purse or electronic ticket without carrying additional card;

a second function: the mobile device works as a card reader to read an exterior RFID tag data, wherein such a manner further broadens the application of the framework; and a third function: the mobile device accesses the smart card of electronic purse in the Combi-SIM directly to enable user to read or alter or set up its information content.

* * * * *